United States Patent
Chambers et al.

(10) Patent No.: US 7,624,018 B2
(45) Date of Patent: Nov. 24, 2009

(54) SPEECH RECOGNITION USING CATEGORIES AND SPEECH PREFIXING

(75) Inventors: Robert L. Chambers, Issaquah, WA (US); Bo-June Hsu, Redmond, WA (US); Oscar H. Newkerk, III, Kirkland, WA (US); Philipp H. Schmid, Mercer Island, WA (US); David Jeremy Guy Wood, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 10/799,356

(22) Filed: Mar. 12, 2004

(65) Prior Publication Data
US 2005/0203740 A1 Sep. 15, 2005

(51) Int. Cl.
*G10L 15/00* (2006.01)
(52) U.S. Cl. .............. 704/275; 704/270; 704/257
(58) Field of Classification Search .......... 704/275, 704/270, 257
See application file for complete search history.

(56) References Cited

U.S. PATENT DOCUMENTS

| | | | | |
|---|---|---|---|---|
| 6,088,671 | A | 7/2000 | Gould et al. | 704/235 |
| 6,546,401 | B1 * | 4/2003 | Iizuka et al. | 707/104.1 |
| 6,609,091 | B1 * | 8/2003 | Budzinski | 704/9 |
| 6,839,669 | B1 * | 1/2005 | Gould et al. | 704/246 |
| 2003/0233237 | A1 | 12/2003 | Garside et al. | 704/270 |
| 2004/0098263 | A1 * | 5/2004 | Hwang et al. | 704/266 |
| 2004/0107088 | A1 * | 6/2004 | Budzinski | 704/10 |
| 2007/0179778 | A1 * | 8/2007 | Gong et al. | 704/9 |

OTHER PUBLICATIONS

"Your Pad or MiPad," Microsoft Corporation, http://research.microsoft.com/research/srg/mipad.aspx, 2006, pp. 1-2.
"Speech Recognition in Office XP," Microsoft Corporation, http://www.microsoft.com/office/previous/xp/speech/asp, May 30, 2001, pp. 1-3.
"Using Speech Recognition for the First Time in Office," Microsoft Corporation, http://office.microsoft.com/en-us/assistance/HA010565111033.aspx, pp. -1-3.
"VoiceXML and Next-Generation Voice Services," Adam Hocek, MXL 2002 Proceedings by deepX, www.RenderX.com, pp. 1-15.
"IBM ViaVoice Gold," IBM, pp. 1-46.

* cited by examiner

*Primary Examiner*—Daniel D Abebe
(74) *Attorney, Agent, or Firm*—Westman, Champlin & Kelly, P.A.

(57) ABSTRACT

Speech recognition utilizing categories and prefixes is disclosed. Categories identify types of recognition and allow different grammars and prefixes for each category. Categories can be directed to specific applications and/or program modules. Uttering a prefix allows users to easily direct text to specific grammars for enhanced recognition, and also to direct the recognized text to the appropriate application/module.

18 Claims, 6 Drawing Sheets

SPEECH RECOGNITION USING CATEGORIES AND SPEECH PREFIXING

BACKGROUND OF THE INVENTION

The present invention relates to computerized speech recognition. More particularly, the present invention relates to an apparatus and methods to remove ambiguity with respect to a speech recognition system.

Speech recognition is a technology that has a number of useful applications that allow people to interface with computing systems using their voices. These applications include: allowing a user to dictate text into a document; allowing a user to issue commands to one or more computer systems via speech; improving automated telephony systems; and many other applications. Such systems are useful in large centralized-server applications, such as computerized telephony processing systems; user interaction with desktop computing products; and even improved interaction and control of mobile computing devices.

Speech recognition is known and is being actively researched as perhaps the future of human interaction with computing devices. While speech recognition technology has progressed rapidly, it has not been perfected. Currently, speech recognition requires substantial computing resources and has not achieved 100% recognition accuracy. This is partly due to inherent ambiguities in human language, and also due, in part, to varying domains over which user speech may be applied.

In a speech recognition system supporting multiple third party applications, grammars from different applications will often accept the same speech command. Thus, there is inherent ambiguity in which application should execute the command when a user issues such a command. For example, the command "send message" may be accepted by grammars from both Microsoft Outlook and Microsoft Messenger, both of which are available from Microsoft Corporation of Redmond, Wash. In addition to the ambiguity created by determining which application to direct a command to, there is reduced recognition accuracy when a command of a much more constrained grammar (such as would be directed to a specific application), is required to be recognized by a larger grammar such as a large vocabulary dictation grammar.

Providing a speech recognition system and methods that could facilitate the direction of user speech to specific programs and/or modules as well as attempt to recognize such speech with specifiable grammars would represent an improvement to speech recognition without adding significant complexity to the user experience.

SUMMARY OF THE INVENTION

Speech recognition utilizing categories and prefixes is disclosed. Categories identify types of recognition and allow different grammars and prefixes for each category. Categories can be directed to specific applications and/or program modules. Uttering a prefix allows users to easily direct text to specific grammars for enhanced recognition, and also to direct the recognized text to the appropriate application/module.

DETAILED DESCRIPTION OF ILLUSTRATIVE EMBODIMENTS

Figure 1:
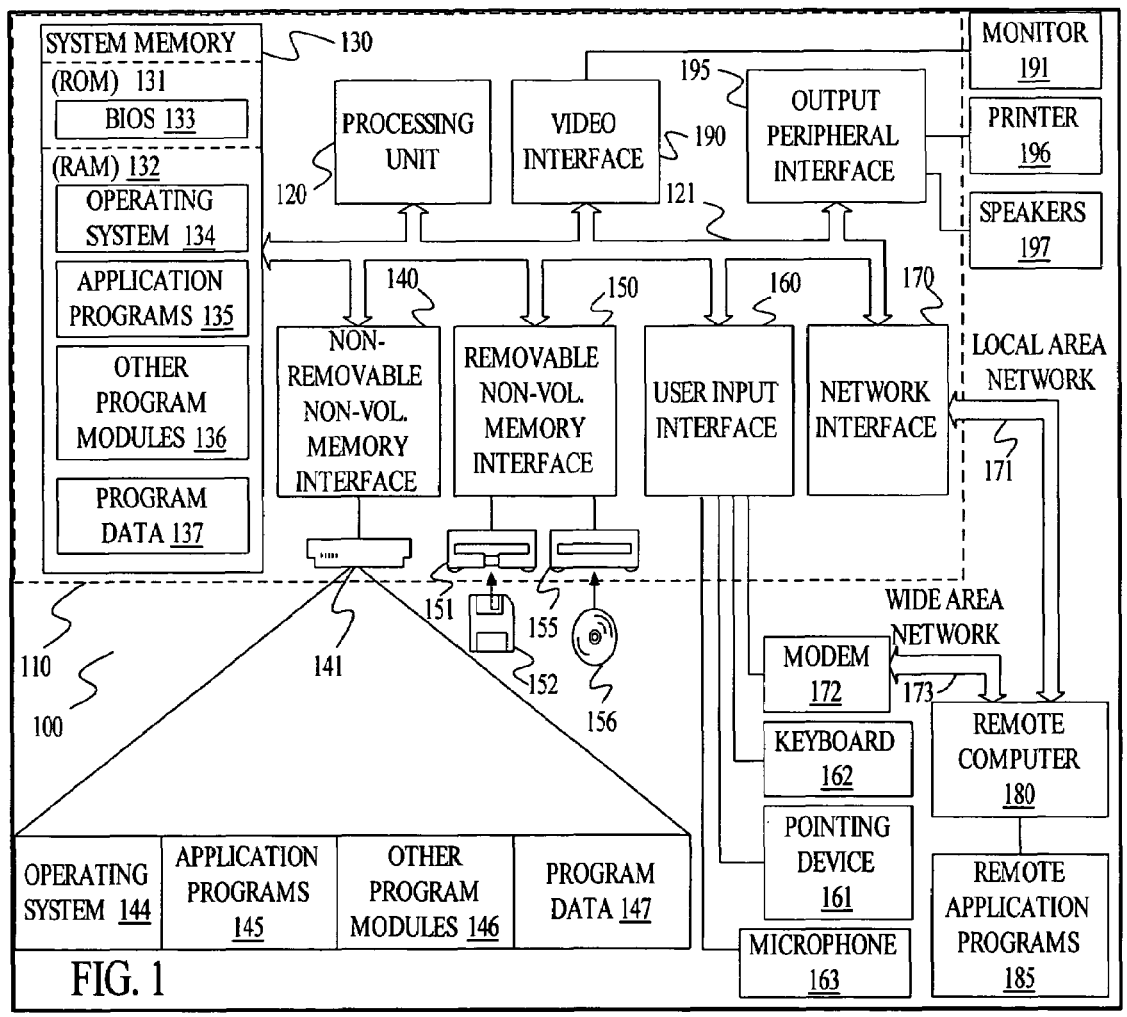
FIG. 1 is a diagrammatic view of a suitable computing environment for practicing embodiments of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
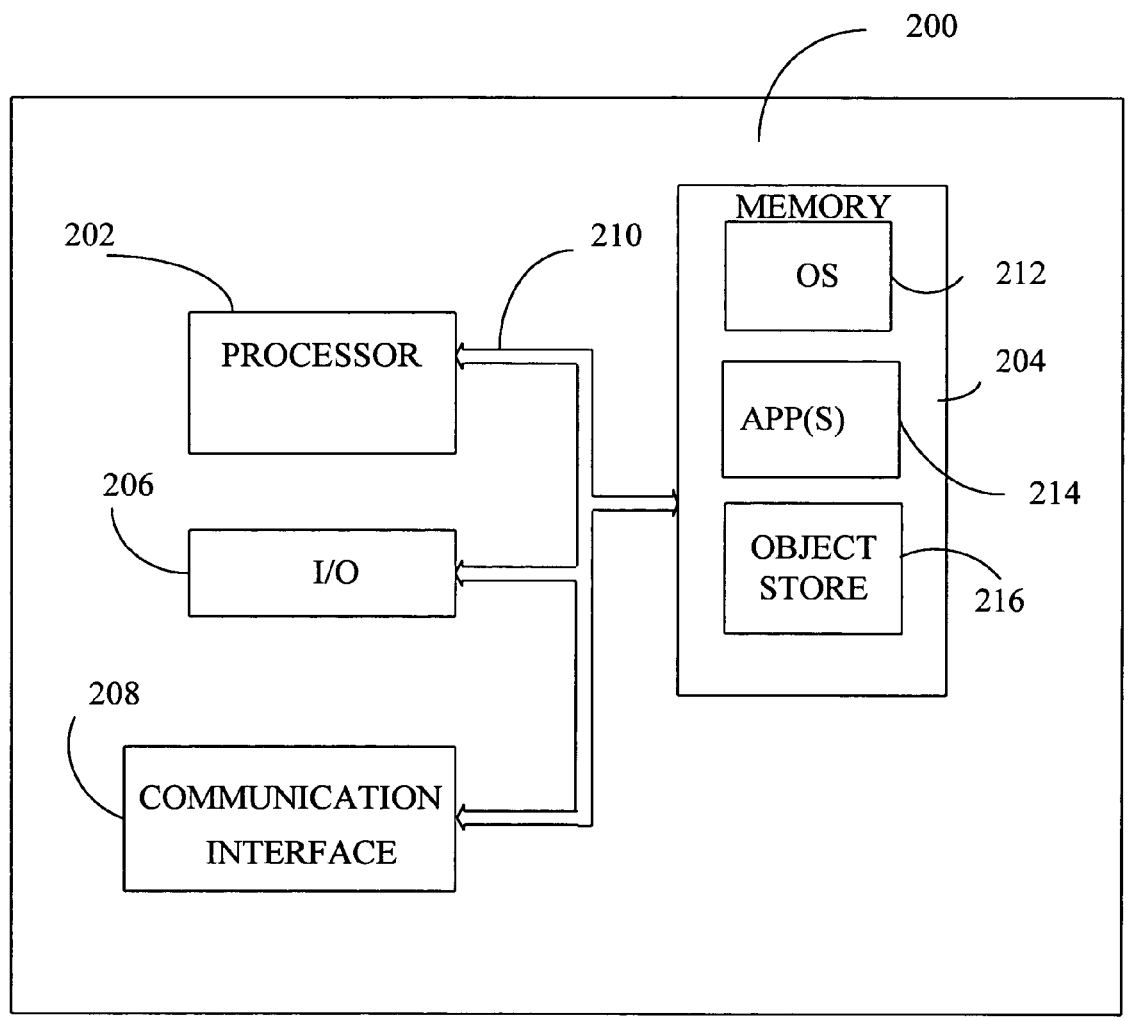
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

In accordance with one broad aspect of the present invention, a system is provided that facilitates recognizing speech specific to one or more computer applications and/or program modules using a grammar specific to such application/modules and directing the recognized text to an appropriate target. Additionally, grammar categories can be deterministically selected by uttering user-specifiable speech prefixes. For example, a user dictating text in dictation mode to a speech recognition system can require that the next word following a speech prefix (for example "Computer") be recognized using whichever command grammar accepts the speech. In this manner, the word will be recognized based upon a much more constrained grammar and recognition accuracy will be improved. As will be described below in greater detail, embodiments of the present invention generally employ categories and prefixes to deterministically direct portions of speech to the correct grammars/application.

Figure 3:
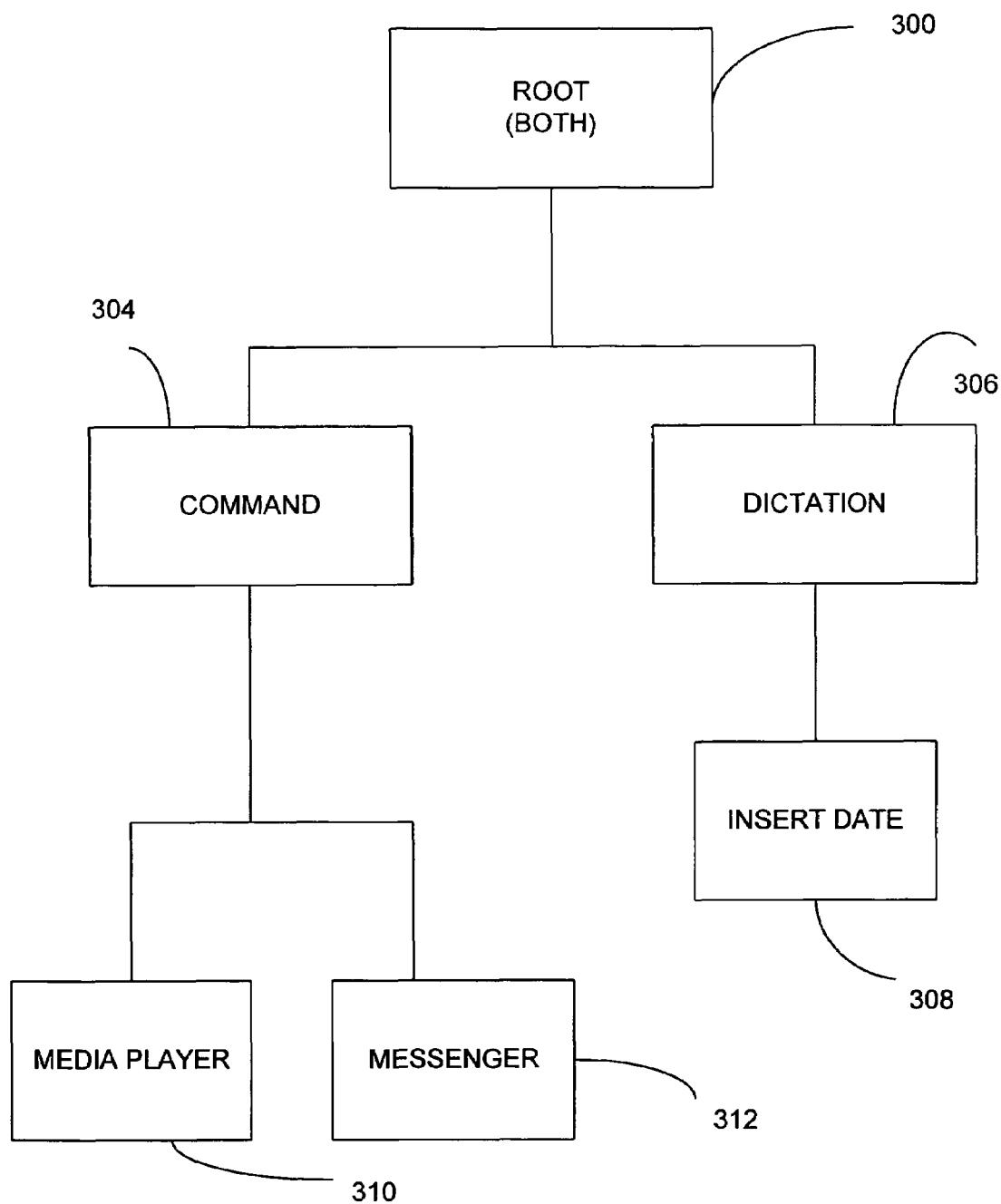
FIG. 3 is a diagrammatic view of a hierarchical category structure in accordance with an embodiment of the present invention.

FIG. 3 is a diagrammatic view of an example category hierarchy in accordance with an embodiment of the present invention. At the highest level of the hierarchy, is the root category 300 which is also labeled "Both". When the root category is set as the ActiveCategory, both command category 304 and the dictation category 306 will be active. In accordance with an embodiment of the present invention, an ActiveCategory is introduced. ActiveCategory is a system property that indicates the category in the recognizer hierarchy that has the current "focus" of the speech recognizer. Preferably, all grammars associated with the ActiveCategory category and its descendent categories can be accessed without saying the category prefix. For example, if dictation category 306 is the active category, grammars associated with the InsertDate category 308 can be accessed without a prefix. As illustrated, a pair of additional categories 310 and 312 are of the command category type and are specifically for Media Player and Messenger, respectively. Additional categories can be created under the command or dictation categories as the system is expanded and/or additional third party applications are added. The manner in which this expansion is effected is set forth below in greater detail with respect to FIG. 4. Preferably, prefixes are required when speech is to be directed to a category that is not the current active category or a descendent thereof. Accordingly, when "both" is the active category all prefixes are optional. However, when dictation is the active category, prefixes are required for command, Media Player and Messenger speech while prefixes are optional for dictation and insert date categories. When command is the active category, prefixes are optional for command, Media Player and Messenger, while prefixes are required for dictation and insert date. As an example of utilization of the above categories and prefixes, suppose a user wants to insert the text "check spelling" into a Microsoft word document only through voice. With existing implementations of speech recognizers, the user must say "dictation mode . . . check spelling . . . command mode." Using embodiments of the present invention, the user need only utter "insert text: check spelling." As another example, consider both a Media Player application and a command category listening for "play solitaire." In some speech recognizers, the application with the last activated grammar matching the input receives the recognition. However, by providing the Media Player category with a specified prefix, such as "DJ" and the command category with prefix "computer" the user can disambiguate the intent by saying "DJ: play solitaire" or "computer: play solitaire."

By allowing customizable prefixes and the ability to extend the system to third party applications, users can now, in accordance with embodiments with the present invention, essentially speak to different components of the system.

Figure 4:
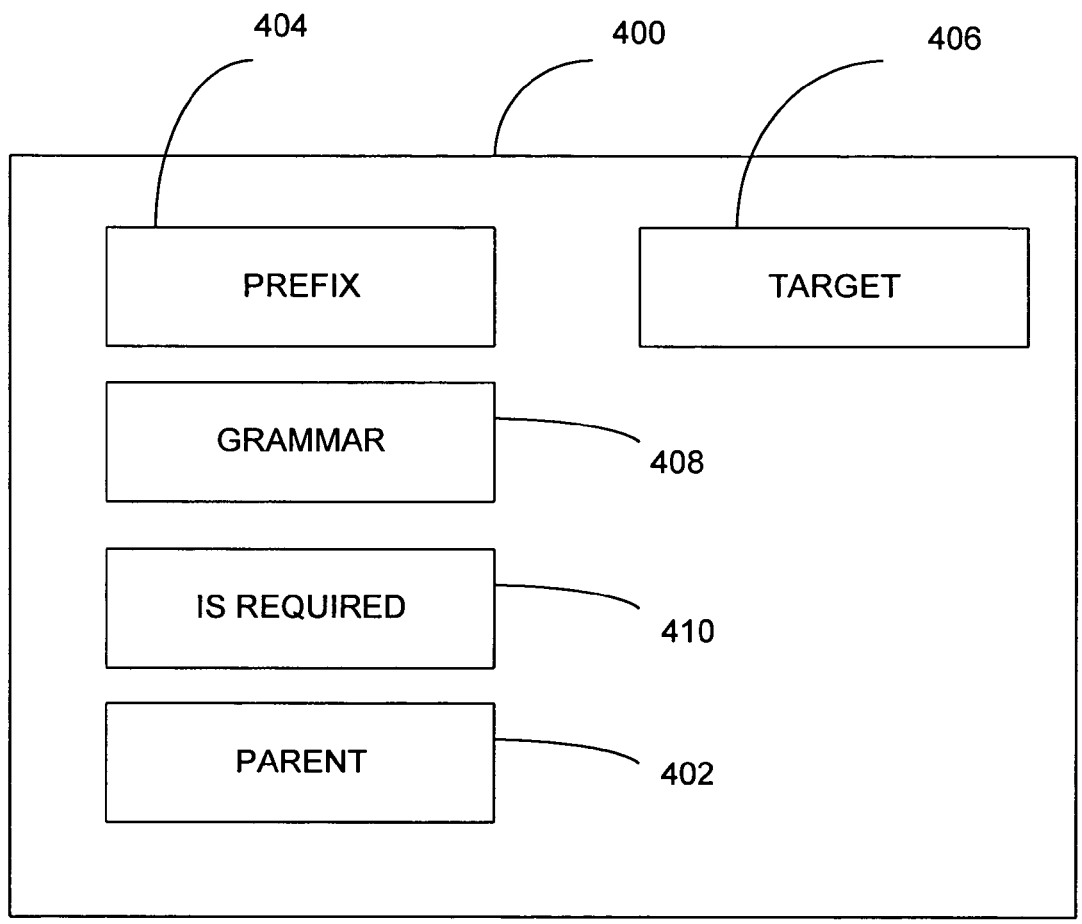
FIG. 4 is a diagrammatic view of a category data structure in accordance with an embodiment of the present invention.

FIG. 4 is a diagrammatic view of a data structure 400 used to facilitate implementation of categories and prefixes in accordance with embodiments of the present invention. Structure 400 preferably includes a field 402 that indicates the parent of the data structure. For example, Media Player category 310, illustrated in FIG. 3 would have field 402 set to indicate that its parent is command category 304. Field 404 in structure 400 indicates the prefix that is used to invoke the category. In the example given above, Media Player 310 may have a prefix of "DJ". Preferably, each grammar associated with the category has its own target application or module. Field 408 specifies the category-specific grammars that are to be used when either the category is active, or its prefix is uttered. Finally, field 410 is a flag used to indicate if prefixes are required in order to invoke the category. As new categories are added, it is important that the grammar(s) at the highest level of the hierarchy be adapted, or otherwise modified, to recognize the prefix of the added category. For example, if Windows Media Player 310 has a prefix of "DJ" it is important that this word be recognized when any category in the recognizer system is active.

Figure 5:
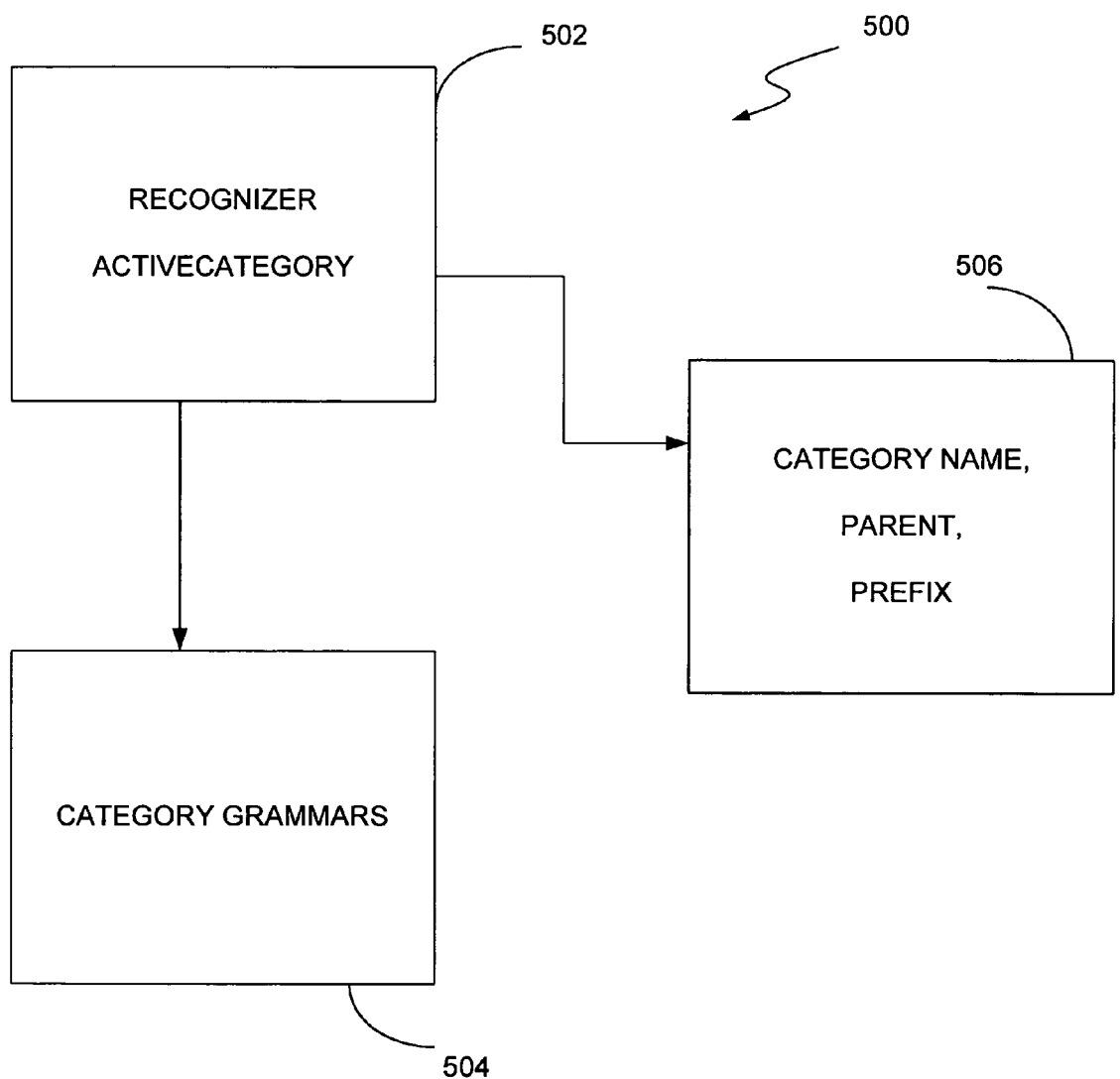
FIG. 5 is a diagrammatic view of a recognizer in accordance with an embodiment of the present invention.

FIG. 5 is diagrammatic view of a recognizer system in accordance with an embodiment of the present invention. System 500 includes an indication of the recognizer's current active category 502 which includes pointers to the specific grammars 504 of the active category, as well as the category name, parent, and prefix as indicated at block 506.

Embodiments of the present invention also preferably include a system indication of the type of speech for which it is listening. This is currently done, to a limited extent, in modern speech recognition systems when a speech recognizer will indicate that it is "listening for diction" or "listening for commands." Preferably, the visual indication, in accordance with embodiments of the present invention, will indicate the category name or an easily understandable equivalent thereof. For example, when the active category is Media Player, the visual indication may be, "Listening for Windows® Media Player commands." These indications can be tailored as appropriate and may even be defined in the data structure illustrated in FIG. 4.

Figure 6:
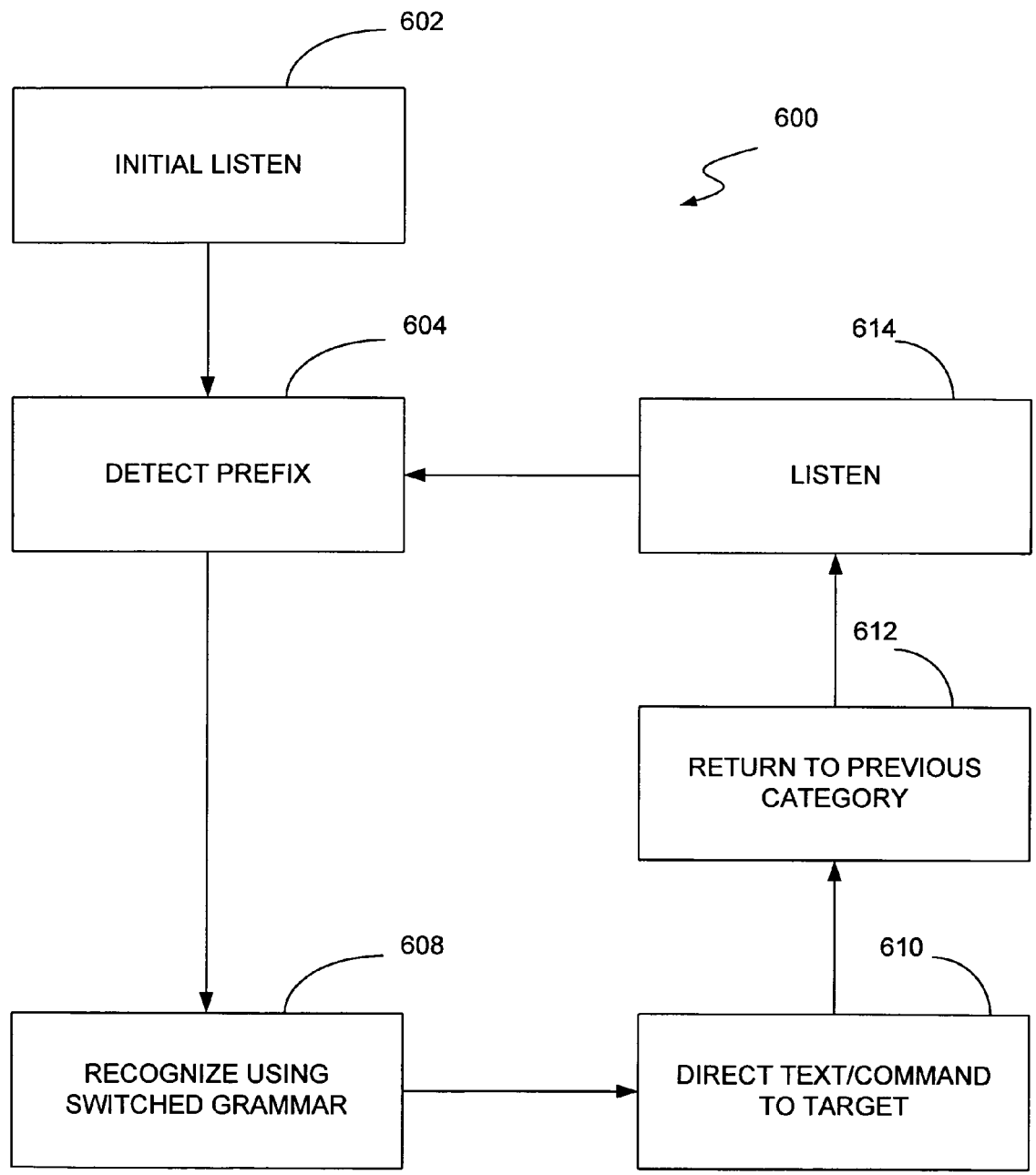
FIG. 6 is a flow diagram of a method of recognizing speech in accordance with an embodiment of the present invention.

FIG. 6 is a diagrammatic view of a speech recognition system operating in accordance with an embodiment of the present invention. The method 600 begins at block 602 where the system begins listening using one or more user-specified, or default grammar(s). An example of such an initial state is when grammars for speech accessibility are activated for recognition. One manner in which the specification can be done is by having user click or otherwise select an initial category related to a set of grammar(s), such as "Command." Additionally, the product can be configured such that, barring any user changes, the recognizer will begin recognizing using the "both" category. At block 604, a prefix corresponding to a category is recognized. Preferably, this prefix is a spoken trigger word or phrase, such as "DJ" or "Computer." At block 608, the speech following the prefix is recognized using a set of grammars that correspond to the prefix. The recognized text is then directed to the appropriate target based upon the grammar that was used to recognize the text, as indicated at block 610. Once the target has received the text, the recognizer continues listening using the previous category as indicated at blocks 612, 614.

The use of an ActiveCategory reduces the degree to which users will need to utter prefixes. For example, if a user is interacting primarily with a Media Player application, it is undesirable to require the user to utter a prefix for every command directed to the Media Player application. Instead, the user can change the ActiveCategory to Media Player, using, for example, a voice command such as "Change active category to Media Player" or by manipulating a user interface element. Once the active category is switched to Media Player, the prefix for grammars not associated with the Media Player are required. Thus, in order to start an application entitled "Solitaire" the user must say, "Computer Start Solitaire." However, when the Media Player is the ActiveCategory, the user need not utter the prefix for grammars associated with the Media Player.

A typical user interaction in accordance with an embodiment of the present invention is as follows. A user starts the recognizer by interacting with a user interface element such as a microphone button. Initially, the recognizer will have grammars associated with speech accessibility activated and ready for recognition. A user can then utter a command, such as "Start Media Player," which will be recognized using the initially activated grammars, and cause the recognizer to start an instance of the Media Player application. When the Media Player application is invoked, it activates additional application-specific grammars for controlling the playback of media content. Next, the user may utter, "Computer Start Solitaire." Unlike prior art approaches, only grammars associated with the Command category can receive the recognition since the user explicitly specified the category via the prefix. In this example, the recognizer will start an instance of the "Solitaire" application. Next, the user changes the ActiveCategory to Media Player, since the user wants to interact with the Media Player without having to continually prefix each command to the Media Player. Then, when the user says, "Start Solitaire" the Media Player will receive the recognition and start playing media entitled "Solitaire." This is because the Media Player was the ActiveCategory, and the utterance "Start Solitaire" did not include any prefix.

Aspects of the present invention provide an extensible, intuitive speech recognition experience for users while simultaneously facilitating increased recognition accuracy and disambiguation. It is expressly contemplated that embodiments of the present invention will be useful in any situation where speech recognition is done electronically. Accordingly, a wide variety of applications ranging from complex call centers to mobile computing devices will all benefit from the features and aspects provided herein.

Although the present invention has been described with reference to particular embodiments, workers skilled in the art will recognize that changes may be made in form and detail without departing from the spirit and scope of the invention.

What is claimed is:

1. A computer-implemented method of recognizing speech, the method comprising:
    employing a computing device to recognize a predefined prefix in user speech, the predefined prefix being associated with a single grammar in a set of grammars, wherein the predefined prefix is also associated with a target software application;
    recognizing text from speech following the prefix using the single grammar associated with the recognized predefined prefix;
    identifying the target software application that is associated with the single grammar, the target software application being selected from a plurality of target software applications, associated with other grammars, based on the predefined prefix; and
    directing recognized text to the target software application associated with the single grammar and the predefined prefix.

2. The method of claim 1, wherein the prefix is a word.

3. The method of claim 1, wherein the prefix is a phrase.

4. The method of claim 1, wherein a category is provided associating the predefined prefix, single grammar, the target software application, and an identification of a parent of the category together.

5. The method of claim 1, executed upon a desktop computer.

6. The method of claim 1, executed upon a mobile computing device.

7. A speech recognition system comprising:
    an input for receiving speech;
    a processor for recognizing speech using a set of one or more grammars;
    wherein the processor is adapted to receive a first speech input and recognize a prefix associated with a desired category in the first speech input, and wherein the processor is adapted to recognize the first speech input using a first grammar associated with the desired category when the prefix is recognized to generate an output;
    wherein the output is provided to a target software application associated with the grammar associated with the prefix; and
    wherein, for a subsequent speech input,
        the processor recognizes the subsequent speech input using the first grammar associated with the desired category if a subsequent prefix is not identified in the subsequent speech input; and
        the processor recognizes the subsequent speech input using a second grammar that is different than the first grammar if a subsequent prefix that indicates another category is recognized in the subsequent speech input.

8. The speech recognition system of claim 7, wherein the prefix must be recognized in order to activate the first grammar to recognize the first speech input.

9. The speech recognition system of claim 7, wherein the desired category is identified as an ActiveCategory.

10. The speech recognition system of claim 9, and wherein the processor receives the subsequent speech input that does not include an identified prefix and automatically recognizes the subsequent portion of input speech using the first grammar that is associated with the ActiveCategory.

11. The method of claim 4, wherein the category is defined as an ActiveCategory.

12. The method of claim 11, and further comprising:
receiving a portion of speech;
identifying whether the portion of speech includes a prefix;
if the portion of speech does not include an identified prefix, automatically recognizing the portion of speech input using the grammar associated with the ActiveCategory; and
if the portion of speech does include an identified prefix, recognizing the portion of speech using a grammar, associated with the identified prefix, that is different than the grammar associated with the ActiveCategory.

13. A system comprising:
an input for receiving speech;
a plurality of target software applications;
a processor for recognizing received speech using a set of grammars;
a plurality of grammar categories, wherein each of the plurality of grammar categories is represented by a data structure that indicates a predefined prefix associated with the grammar category, a single grammar of the set of grammars associated with the grammar category, an identification of a parent of the grammar category, and a particular target software application of the plurality of target software applications associated with the grammar category;
wherein the processor receives a portion of input speech and accesses the data structures that represent the plurality of grammar categories to identify a prefix in the portion of input speech and to generate an output by recognizing the portion of input speech, the portion of input speech being recognized using a single grammar selected from the set of grammars based on the identified prefix, wherein the output is provided to the particular target software application that is identified in the plurality of grammar categories as being associated with the identified prefix.

14. The speech recognition system of claim 13, wherein, for each of the plurality of grammar categories, the data structure representing the grammar category includes a flag that indicates whether the prefix associated with the grammar category is required to invoke the grammar category.

15. The speech recognition system of claim 13, wherein the at least one grammar category associated with the identified prefix is defined as an ActiveCategory, and wherein the processor receives a subsequent portion of input speech that does not include an identified prefix and automatically recognizes the subsequent portion of input speech using the at least one grammar associated with the ActiveCategory.

16. The speech recognition system of claim 15, wherein the plurality of grammar categories are arranged in a hierarchy including at least one parent category having at least one descendent category.

17. The speech recognition system of claim 16, wherein the processor is configured to access all grammars associated with the ActiveCategory and any descendent categories that descend from the ActiveCategory for a subsequent speech input that does not include an identified prefix.

18. The speech recognition system of claim 16, wherein for subsequent portions of input speech a prefix is only required to invoke any grammar categories that are not included in the ActiveCategory and are not descendent categories that descend from the ActiveCategory.

* * * * *